US006074584A

United States Patent [19]

Hinzpeter et al.

[11] Patent Number: 6,074,584
[45] Date of Patent: Jun. 13, 2000

[54] METHOD AND DEVICE FOR MANUFACTURING PRESSED PARTS FROM HARD METAL, CERAMIC, SINTERED METAL OR LIKEWISE

[75] Inventors: Jürgen Hinzpeter; Ingo Schmidt, both of Schwarzenbeck; Ulrich Gathmann; Jörg Reitberger, both of Hamburg; Klaus-Peter Preuss, Mölln; Alexander Oldenburg, Dassendorf; Joachim Greve, Pogeez, all of Germany

[73] Assignee: Wilhelm Fette GmbH, Schwarenbek, Germany

[21] Appl. No.: 09/055,642

[22] Filed: Apr. 6, 1998

[30] Foreign Application Priority Data

Apr. 24, 1997 [DE] Germany ........................... 197 17 217

[51] Int. Cl.[7] .................................................... B29C 43/02

[52] U.S. Cl. ........................ 264/40.5; 264/40.1; 264/109; 264/120; 419/66

[58] Field of Search .................................... 264/40.5, 109, 264/40.1, 120; 419/66

[56] References Cited

U.S. PATENT DOCUMENTS 4,062,914 12/1977 Hinspeter .............................. 264/40.1
5,004,576 4/1991 Hinzpeter .............................. 264/40.5
5,087,398 2/1992 Molaire .................................. 264/109
5,288,440 2/1994 Katagiri et al. ....................... 264/40.5

FOREIGN PATENT DOCUMENTS 39 19 821 A1 12/1990 Germany .
42 09 767 C1 5/1993 Germany .

*Primary Examiner*—James Derrington
*Attorney, Agent, or Firm*—Vidas, Arrett, & Steinkraus

[57] ABSTRACT

A method for manufacturing pressed parts from hard metal, ceramic, sintered metal or likewise, in which a part of a charge of a powder-like or granular original material is filled into a pressing mould and is pressed with at least one pressing stamp against a counter surface, wherein the force and the distance of the pressing stamp are measured, and wherein there are the following method steps:

depending on the geometry of the pressed part and on the original material during the compression for a pressing stamp a desired force-distance diagram (nominal curve) is determined and stored;

in a computer during the compression the measured values for the distance and the force of the pressing stamp are compared to the nominal curve;

by way of at least one separately actuated section of the pressing stamp or of a separate stamp the pressure on the pressing material during the compression phase is increased or reduced as soon as a deviation from the nominal curve is determined, in order at the end of the compression phase to obtain an equal density of each pressed part.

3 Claims, 2 Drawing Sheets

METHOD AND DEVICE FOR MANUFACTURING PRESSED PARTS FROM HARD METAL, CERAMIC, SINTERED METAL OR LIKEWISE

BACKGROUND OF THE INVENTION

The invention relates to a method for manufacturing pressed parts from hard metal, ceramic, sintered metal or likewise.

It is known to manufacture moulded parts from hard metal, ceramic, sintered metal or likewise with the help of pressing. The powder-like or granular material is to be prepared such that with an applied pressure force the pressed part gets a homogeneous structure and may be sintered. A usual shaping is the so-called direct pressing in correspondingly designed pressing moulds or matrices to which pressing stamps are allocated. Corresponding to the respective pressing pressure there results a differing density with the pressed part. Pressed parts with a lesser density however shrink on sintering greater than pressed parts with a higher density. By way of differently adjustable pressing distances for the upper and lower stamp it is attempted to minimize deviations of density. Nevertheless differing densities in practise may arise by way of differing pressing forces, which in turn with the same height of the pressed parts may, e.g. by way of filling fluctuations, be of a few percent. With the manufacture of pressed parts for e.g. hard metal cutting plates additionally also criteria of the immersing depth of the upper stamp up to the beginning of the edge clearance-angle in the matrix are to be adhered to in order to obtain a sharp cutting edge. Furthermore the complete height of the pressed part must be precisely adhered to.

In order to obtain as uniform a density as possible e.g. within a charge, it is known to measure the pressing force and subsequently to carry out a correction over the filling for the subsequent pressed part (DE 42 09 767 C1).

BRIEF SUMMARY OF THE INVENTION

It is the object of the invention to specify a method for manufacturing pressed parts of hard metal, ceramic, sintered metal or likewise, with which a correction to the pressed part is already carried out during the pressing procedure.

With the invention there are provided at least two position sensors, specifically for the at least one pressing stamp and the at least one further pressing stamp or a section of the pressing stamp, which in each case input their readings to a control computer. Furthermore a force sensor is allocated to the pressing stamp or to a section of the pressing stamp. Its values too are inputted into the control computer.

The position sensors are to ensure that e.g. with an upper and a lower stamp these are moved to a given position in the matrix, in order to produced the given geometry of the pressed part and to adhere to its dimensions. Due to the differing filling, fluctuations of density may however result which must be avoided. For this reason, the invention provides for a further pressing stamp or a pressing stamp section, which is actuated by the control computer if during the respective pressing procedure a deviation from the desired density value is evaluated.

For carrying out the method according to the invention therefore for each pressed part mould or the original material a specific force-distance diagram is evaluated by pressing trials. During the compression phase the sensors measure values for the respective force and the respective distance which are inputted to the control computer which therefrom evaluates a force-distance course which then is finally deposited in the control computer as a nominal curve. It is to be understood that later changes in the course of the curve are possible in the computer at any time.

During the production the control computer then in the compression phase, for each pressed part carries out a nominal-actual value comparison of the measured force and distance values with the nominal curve. With deviations the control is engaged and on actuation of the further stamp or of a stamp section the force component administered by the associated drive is increased or decreased, i.e. the corresponding stamp section is set forwards or backwards relative to the other stamp or to the counter surface. In this manner the density of the pressed part is optimized, whilst the dimensional accuracy of the pressed part is achieved by the adherence to the stamp distances.

With the device for carrying out the method according to the invention usefully either the upper or the lower stamp of a press is subdivided into coaxial sections, wherein the inner or the outer stamp is used for optimizing the density depending on for which surface of the pressed part it is not critical which distance it has e.g. to the opposite lying surface. If for example a cutting plate is to be manufactured with the method according to the invention usefully the inner lower stamp is applied for optimizing the density since the outer surface of the floor of the cutting plate with respect to the upper side of the cutting plate or of the cutting edge must assume a precise distance. This outer, e.g. annular floor surface then forms the seating surface on tensioning the cutting plate. The inner surface which accordingly forms the floor of a corresponding recess, within limits may have any distance to the cutting edges.

BRIEF DESCRIPTION OF THE DRAWINGS

The invention is hereinafter described in more detail by way of the drawings.

DETAILED DESCRIPTION OF THE INVENTION

Figure 1:
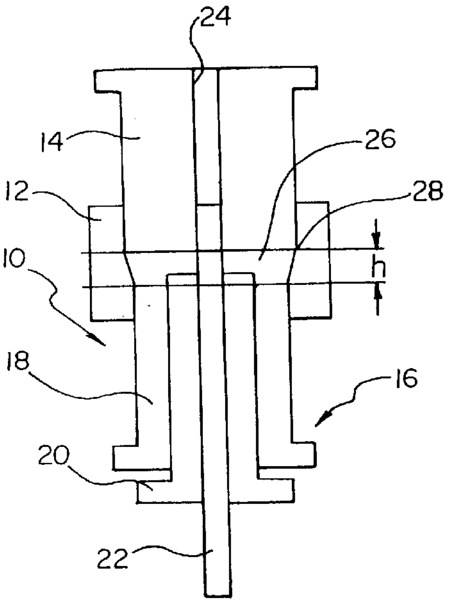
FIG. 1 shows schematically the tool of a press for carrying out the method according to the invention.

In FIG. 1 there is represented a tool 10 of a press with a matrix 12, an upper stamp 14, a lower stamp 16 which is comprised of an outer stamp 18 and an inner stamp 20 arranged coaxially to this. The stamps 14, 18 and 20 are driven by a separate drive, for example a hydraulic cylinder (see for this later FIG. 4). In the inner stamp 20 a spike 22 is telescopically guided which immerses into a corresponding, e.g. central bore 24 of the upper stamp 14.

In FIG. 1 the end condition is shown in which a pressed part 26 in the form of a cutting plate is formed from a powder-like original material, for example hard metal. The cutting edge is to be recognized at 28. It is formed in that the upper stamp 14 is immersed over a given distance (immersing depth) into the bore of the matrix 12. Under this the matrix bore comprises a conical section for forming the clearance angle. The total height of the pressed part 26 is indicated at h. It is determined by the immersing depth of the upper stamp 14 and the immersing depth of the outer stamp 18. In order to achieve a sharp cutting edge 28 it is necessary to exactly adhere to the immersing depth of the upper stamp 14, i.e. the upper stamp 14 must immerse into the matrix 12 exactly up to the beginning of the clearance angle (point 28).

Figures 2A, 2B, 2C, 2D:
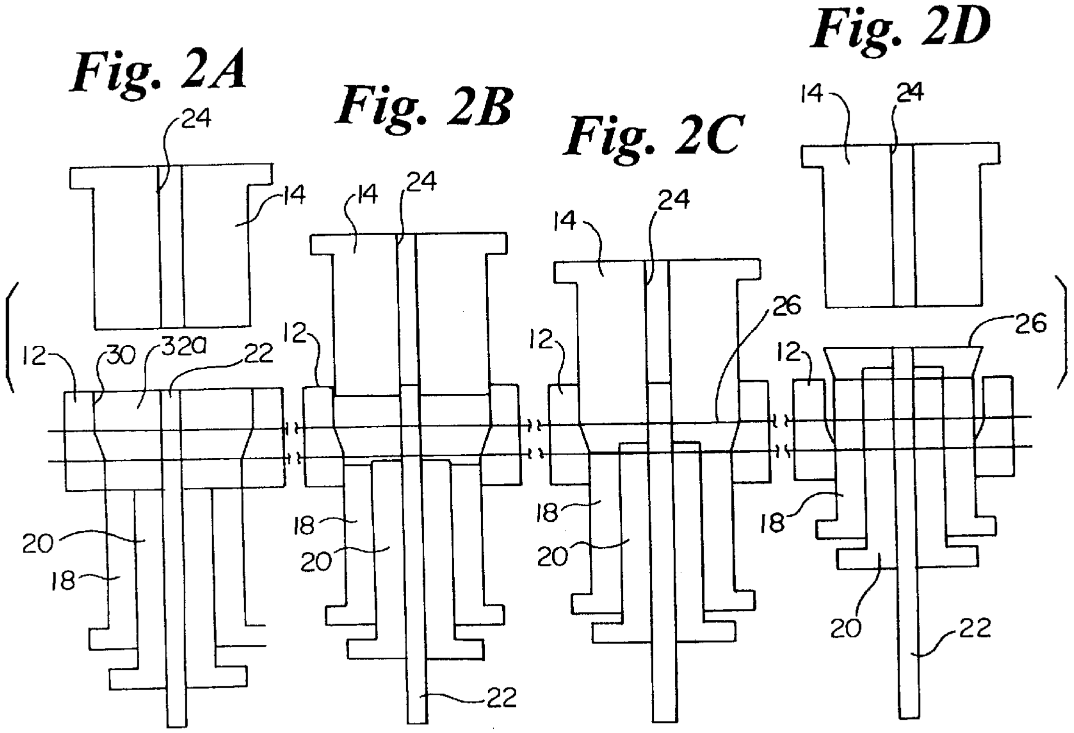
FIG. 2 shows the movement of the tool according to FIG. 1 during individual phases.

In the FIGS. 2*a* to 2*d* there are represented movement phases on manufacturing the pressed part 26. In FIG. 2*a* the lower stamps 18, 20 close the mould hollowing 30 of the matrix 12 on the under side, wherein the spike 22 extends up to the upper side of the matrix 12. The upper stamp 14 is located above the matrix 12 in order to be able to fill the powder-like original material into the mould hollow space 30. If this has been effected the lower and upper stamp are moved toward s one another as shown in FIG. 2*b*. As can be recognized two inner and outer stamps 20, 18 are moved together, however not synchronously, but rather the inner stamp 20 is moved further than the outer stamp 18 by about a certain amount. This is even amplified in comparison with FIG. 2*c* which represents the condition as is also shown in FIG. 1. The pressed part 26 is completed. In FIG. 2*d* the upper stamp 14 has returned to the original position and the lower stamps expel the press ed part 26 from the matrix 12.

Figure 4:
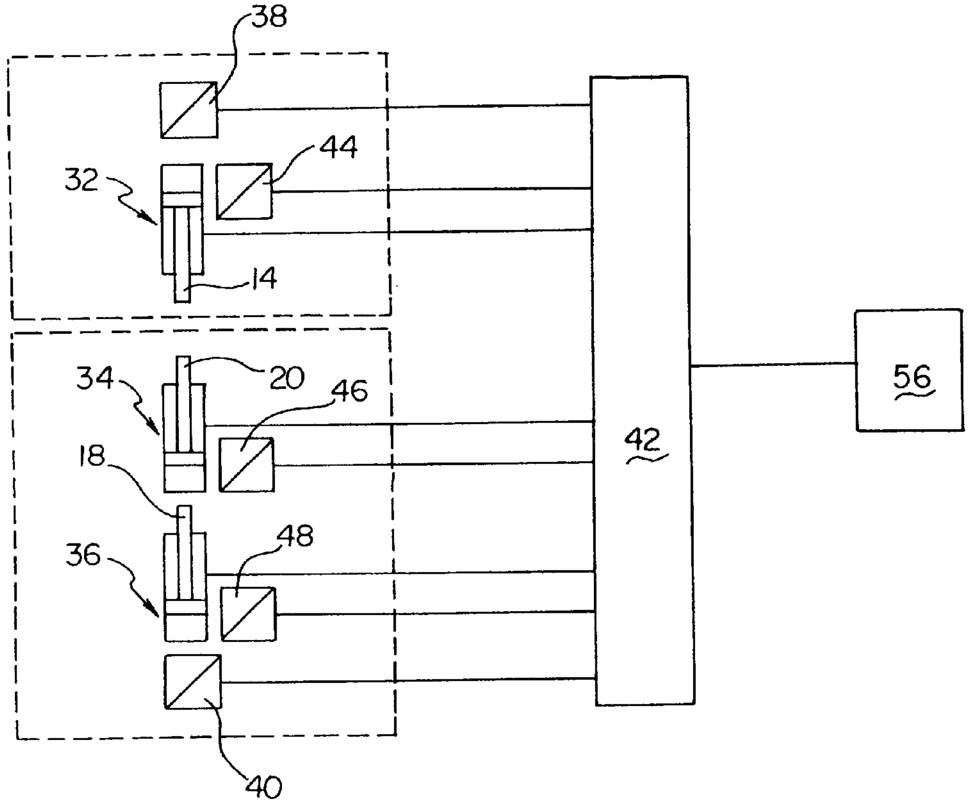
FIG. 4 shows a block diagram for controlling or regulating the press according to claim 1.

In FIG. 4 the stamps 14, 18, 20 are shown schematically leaving out the matrix. It is to be recognized that they arc connected to the pistons of hydraulic cylinders 32, 34 and 36 respectively. With the help of a sensor 38 and 40 respectively the pressing forces of the cylinders 32 and 36 are measured. The output signals of the sensors 38, 40 go to a control computer 42. In each case there are allocated to the stamps 14, 18 and 20 position sensors 44, 48, and 46 respectively, whose output signals likewise reach the control computer 42. With the help of the sensors 38, 40 the forces administered by the stamps 14, 18 are monitored. With the help of the sensors 44, 46 and 48 the distances of the stamps 14, 20 and 18 are monitored.

Figure 3:
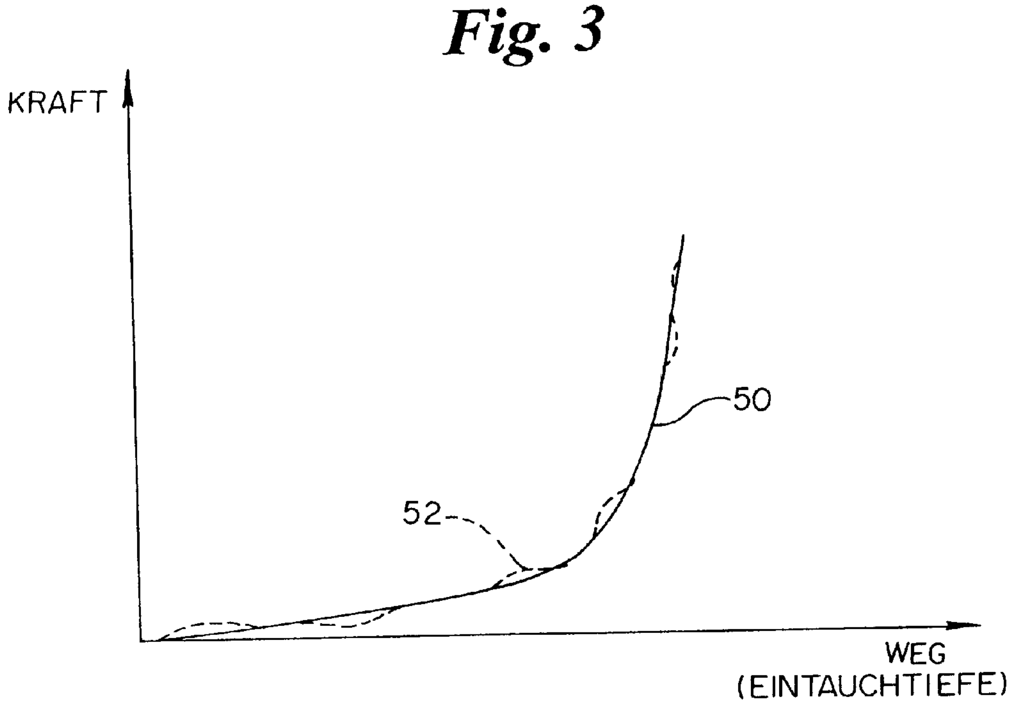
FIG. 3 shows the force-distance diagram for the upper or lower pressing stamp.

From the representation according to FIG. 2 it can be deduced that it is necessary for the upper stamp 14 and the outer lower stamp 18 in each case to travel a predetermined distance in order to ensure the accuracy of the pressed part 26. For the quality of the pressed part 26 it is also decisive that it reproducably has the same density. This may fluctuate with e.g. non-uniform tipping volumes of the charge of the original material 32. With the help of suitable pressing trials then for a given geometry of a pressed part and of the selected original material a certain course of the forcedistance curve may be evaluated which is optimal for a certain pressed part. Such a nominal curve 50 is shown in FIG. 3 with a continuous line. It corresponds for example to the force-distance course with respect to the upper stamp 14. Such a nominal curve 50 evaluated previously by way of trials is deposited in the control computer 42. With the help of the control computer 42 then the stamps 14 and 18 are controlled such that they travel the respective immersing depth up to reaching a precise end position. By way of a comparison with the nominal curve 50 it may be determined whether the forces at the respective immersing depth correspond to the corresponding value of the nominal curve. The pressing force is as known an indicator as to whether the desired density of the material to be pressed at the respective position of the stamp has been reached. The forces and thus also the deviations are measured with the accompanying force sensors 38 or 40. In FIG. 3 they are shown dashed at 52. If such deviations occur the inner stamp 20 is moved over its corresponding cylinder 34, this being either in the direction of the upper stamp 14 or away from this, according to whether an increase or reduction of force is required.

It is to be understood that according to the geometry of a pressed part also an additional pressing stamp may be provided which e.g. is guided radially to the bore of the matrix 12 in order here to carry out the desired increase or reduction in density.

The control computer 42 is controlled via an operating computer which however for the described function of the regulation of a press is not of importance.

We claim:

1. A method for manufacturing pressed parts having a predetermined geometry and a predetermined density, comprising the following steps:

determining a desired force-distance nominal curve based on a predetermined pressed part and the predetermined material pressed to form the pressed part;

storing the determined force-distance nominal curve in a computer;

filling a pressing mould with the predetermined material;

pressing the predetermined material with a pressing tool comprising a pressing stamp and a counter surface, the pressing stamp and counter surface being movable towards each other to press the predetermined material until the pressing stamp and the counter surface are a predetermined distance apart;

measuring the force applied by the pressing stamp during the pressing of the predetermined material;

measuring the distance the pressing stamp moves during the pressing of the predetermined material;

comparing the measured applied force and distance with the stored force-distance nominal curve corresponding to the predetermined pressed part;

applying an adjusting force by pressing the predetermined material with a second pressing stamp, the second pressing stamp applying a varying force to adjust the measured force-distance curve to the stored force-distance nominal curve throughout the pressing step.

2. The method according to claim 1, wherein the pressing tool further comprises a matrix with the pressing stamp on one side of the matrix and the counter surface on the opposite side of the matrix for compressing the material filled into the matrix, wherein the pressing stamp is drivable by a pressing stamp drive and the counter surface is comprised of first and second stamp sections arranged to one another, each stamp section drivable by a first and second stamp section drive, and where the pressing stamp and first and second stamp sections are each provided with a position sensor, and where the pressing stamp and counter surface are provided with a force sensor, and further where a control computer is provided in which a predetermined force-distance diagram is stored and into which the readings of the sensors are inputted for control of the pressing tool in accordance with the force-distance diagram.

3. The method according to claim 2, wherein the pressing stamp forms an upper stamp and the counter surface forms a lower stamp, the lower stamp being divided into an outer and inner stamp, the inner stamp being provided with a position sensor.

* * * * *